ically thereto. Stated another way, hydrated kaolin clay performs a dual function during the zeolite synthesis reactions: it acts as a binder for the reactants, enabling the shaping of the reactant mixture into coherent particles of desired form and size; and, after crystallization of the zeolite is effected, it acts as a diluent for the zeolite crystals formed in situ, thus providing a bonded composite of zeolitic crystals and clay.

United States Patent Office
3,367,886
Patented Feb. 6, 1968

3,367,886
SYNTHETIC ZEOLITE CONTACT MASSES AND METHOD FOR MAKING THE SAME
Walter L. Haden, Jr., Metuchen, and Frank J. Dzierzanowski, Somerset, N.J., assignors, by mesne assignments, to Engelhard Minerals & Chemicals Corporation, Menlo Park, Edison, N.J., a corporation of Delaware
No Drawing. Continuation-in-part of application Ser. No. 343,952, Feb. 11, 1964. This application Feb. 16, 1966, Ser. No. 527,744
18 Claims. (Cl. 252—455)

ABSTRACT OF THE DISCLOSURE

Zeolitic molecular sieve-kaolin clay composites are provided by a process whereby the bonding steps and crystallization steps are integrated as a result of crystallizing the zeolitic molecular sieve from sources of alkali metal oxide, aluminum oxide, and silicon dioxide and water in the presence of raw (hydrated) crystalline kaolin clay while said sources and said raw kaolin clay are intimately mixed together and in the form of particles of the size and shape desired in the active contact masses. In carrying out the process, the formed particles are subjected to hydrothermal treatment without dehydration, whereby the zeolite is crystallized in situ in the presence of the raw clay which, for the most part, does not enter into the reaction. The reacted particles, which possess considerable mechanical strength, comprise a self-bonded mixture of kaolin clay crystals and synthetic zeolitic crystals. The particles are activated by thermal treatment which dehydrates both the zeolite and the clay crystals. Before the activation step, the particles may be ion-exchanged with cations that will impart specific desired properties to the particles.

In a preferred form of the invention, a high silica-to-alumina ratio form of type Y zeolite is crystallized in situ in the presence of the kaolin clay and the particulate reaction mixture includes sodium hydroxide solution and three different forms of kaolin clay. Two of these clay materials are dehydrated calcined noncrystalline products, one (metakaolin) having been obtained by a relatively mild calcination treatment and the other having been obtained by a more severe treatment. The third clay is the raw crystalline kaolin clay.

---

This application is a continuation-in-part of our copending applications Serial No. 343,952, filed February 11, 1964 and now abandoned, Serial No. 389,188, filed August 12, 1964 and Serial No. 446,730, filed April 8, 1965.

The present invention is concerned with composite synthetic zeolite contact masses and their preparation from naturally occurring clay. The invention is especially directed to composite cracking catalysts.

Noteworthy advances in the fields of adsorption and catalysis have resulted from the synthesis of unique crystalline aluminosilicate zeolites known as "molecular sieves." Zeolites of this type retain their structure when at least part of their water of composition is removed, resulting in silicates which possess internal adsorptive areas accessible through openings or pores of definite dimensions which are characteristic of the specific dehydrated zeolite.

Synthetic molecular sieve zeolites are prepared commercially by precipitation from dilute aqueous reaction mixtures containing high purity sources of oxides of sodium, aluminum and silicon in proportions selected to produce the desired zeolitic molecular sieve. For example, to prepare the molecular sieve type zeolite known as "zeolite Y" the reactants described in U.S. 3,130,007 to Breck can be used. A similar zeolite known as "zeolite X" can be produced with reactants described in U.S. 2,882,-244 to Milton.

For virtually all of their industrial uses, synthetic crystalline molecular sieves must be bonded into uniform particles of desired size and shape, such as cylindrical pellets or microspheres. The binder that is used must be such that the valuable properties of the molecular sieve are retained. For uses such as hydrocarbon conversion catalysts, relatively large pore diameter zeolites, such as zeolite X and Y, are used in the form of shaped particles which must possess considerable mechanical strength and thermal stability, especially steam stability. The use of clays as binders for the zeolite crystals has been suggested. To produce such bonded composites, the zeolite is first obtained as a fine crystalline precipitate from dilute reactants. The precipitate is then mixed with water and plastic clay, shaped into particles and heated to set the bond and dehydrate the clay. Reference is made to U.S. 2,973,327 to Mitchell et al. and U.S. 3,140,253 to Plank et al. Clay-zeolite composites of this type are expensive to produce, primarily because of the high cost of the reactants required to crystallize the zeolite and the requirement for a separate bonding step. Moreover, the clay bonded composites leave much to be desired in the way of hardness, especially resistance to attrition. This is especially true of clay-bonded composites suitable for use as cracking catalysts.

An object of this invention is to provide zeolitic molecular sieve composites by a process whereby the sieve is crystallized in situ in the presence of clay in the form of particles of the size and shape desired in the zeolitic molecular sieve composites.

Another object is to provide a process for making particulate molecular sieve composites by a process whereby bonding and crystallization steps are integrated and the need to crystallize the zeolite and thereafter bond the zeolite is obviated.

Another object is to produce molecular sieve composites from comparatively inexpensive mineral ingredients.

Still another object is to produce composites of clay and zeolitic molecular sieves which, when heat activated, are substantially harder and more resistant to attrition than products of generally similar composition but which are made by binding previously formed precipitated zeolite particles with water and plastic clay.

A further object is to produce a molecular sieve in direct contact with a clay diluent which facilitates agglomeration of the molecular sieve and which aids in controlling mass temperature during the reaction forming the molecular sieve.

Another object is the provision of novel methods for converting kaolin clay into cracking catalysts which are markedly more selective than present-day commercial acid-activated clay cracking catalysts even at exceptionally high conversion rates and which have desirable hardness as well as outstanding steam stability.

Another object is to provide molecular sieve composites which possess outstanding stability in the presence of liquid water.

Other objects and features of this invention will be apparent from a description thereof which follows.

This invention results from our discovery that crystalline zeolitic aluminosilicates of the molecular sieve type can be crystallized in situ in the form of shaped masses of desired size and form by carrying out the reaction in direct contact with hydrated kaolin clay which forms coherent masses when mixed with the reactants and which for the most part does not enter into chemical reaction when the other ingredients are reacted and crystallized.

In carrying out the present invention, raw (fully hydrated or uncalcined) kaolin clay is mixed with an aqueous slurry containing reactants (sources of oxides of silicon, aluminum and alkali metal) capable of reacting to produce a synthetic crystalline zeolitic molecular sieve when subjected to hydrothermal treatment without dehydration at about 70° F. to 100° F. and then crystallized under autogenous pressure at 150° F. to 225° F. in the absence of the raw clay. Sufficient raw kaolin (a crystalline aluminum silicate of the approximate formula $Al_2O_3.2SiO_2.2H_2O$) is employed to form a coherent mass with said aqueous reactants. In other words, the raw clay is present in amount sufficient to thicken the reaction mixture, and a reaction mixture which would have the consistency of a fluid slurry in the absence of raw kaolin clay forms coherent reaction particles when the raw clay is mixed therewith. Also included in the mixture is a small amount of a source of alkali metal oxide in addition to the alkali metal oxide required to crystallize the zeolitic molecular sieve in the absence of the added hydrated kaolin clay. This excess of alkali metal oxide is needed to crystallize the zeolite in the presence of the raw clay. The mixture of ingredients is then formed into particles, which can be of the shape and substantially of the size desired in the finished contact masses. The particles are subjected to hydrothermal treatment without dehydration until reaction occurs and a hydrated alkali metal aluminosilicate molecular sieve crystallizes in situ in the presence of the raw clay. X-ray diffraction patterns of the product at this point of the process indicate the resulting base material contains two crystalline components, namely, a crystalline zeolitic molecular sieve (hydrated alkali metal oxide form) and kaolin clay crystals. The species of zeolitic molecular sieve that is crystallized usually has substantially the same characteristic X-ray diffraction lines that the reactants would produce in the absence of the raw clay and extra alkali metal oxide. Present experience indicates that some amorphous material, i.e., material which does not exhibit strong characteristic X-ray diffraction lines, is also present.

The bond between the constituents of the reacted and crystallized particles is strengthened when the base material is activated by heat treatment before or during use. Such heat treatment dehydrates the zeolite and the kaolin clay at least partially. The crystallinity of the clay is destroyed or reduced during the heat treatment. The crystallinity of the zeolite may also be reduced during such treatment. Prior to the heat treatment to strengthen the bond and activate the zeolite, it may be desirable to ion-exchange the zeolite with cations that will impart specific desired properties to the product. For example, to make a cracking catalyst, the ingredients of the reaction mixture are selected to crystallize a relatively large pore diameter zeolitic molecular sieve, e.g., sodium zeolite Y. The resulting base material can then be subjected to base-exchange with ammonium ions and activated thermally.

In carrying out the process of the present invention, the raw clay facilitates particle formation since it permits shaped particles to be formed directly from reaction mixtures not amenable to shaping by conventional means in the absence of the raw clay. Further, the raw clay functions as a "heat sink" during the exothermic reaction leading to zeolite formation and thereby minimizes the possibility of such reaction getting out of control. The presence of the clay in the composites, especially the heat-activated composites, provides desirable stability, especially steam stability, to the composites.

Products of this invention possess remarkable hardness. These particles are significantly harder than particles of similar composition that would be obtained by following the prior art practice of precipitating zeolite as finely divided crystals and then binding the crystals by adding water and raw plastic clay. Composites of especially noteworthy hardness are obtained when carrying out this invention using calcined clay(s) with sodium hydroxide solution as reactants to form the crystalline zeolite.

However, in order to obtain a strongly bonded mixture of zeolitic molecular sieve and dehydrated clay by reaction in situ in the presence of raw kaolin, the zeolite must actually undergo crystallization in the presence of the raw clay crystals. Mere reaction of calcined kaolin and caustic solution in the presence of the raw clay without actual crystallization of the zeolite results in a relatively weak bond. While the zeolite must be crystallized in the presence of the raw clay, the crystalline state of the zeolite may be subsequently destroyed or reduced without substantial impairment of strength and, in some cases, without substantial impairment of the activity of the composite.

It is not presently understood why the process of the invention leads to the formation of composites of such remarkable mechanical strength. In fact, the result is surprising when viewed in light of the fact that the heat activated composites obtained by crystallizing zeolitic molecular sieves in the presence of kaolin clay crystals are also much harder than similarly heat-treated particles of the raw clay per se. Thus, the zeolite ingredient contributes to bond strength when it is crystallized from concentrated reactants in the presence of the clay and it imparts hardness to the clay that the clay would not possess in the absence of the zeolite.

The specific molecular sieve component of the product can be varied by variation in reactants and/or reaction conditions. The zeolitic molecular sieve is crystallized in alkali-metal, usually sodium, form. For example, zeolitic molecular sieves such as zeolite A, X and Y, which are crystallized in sodium form, can be obtained by using sodium hydroxide with suitable sources of reactive alumina and silica and raw clay. Type L zeolite is obtained with a mixture of potassium hydroxide, sodium hydroxide, suitable sources of reactive silica and alumina, and raw kaolin clay. As is known in the art, the alkali-metal form of the zeolite can be exchanged with other cations to form molecular sieves of desired properties. This invention thus encompasses the preparation of composites containing a molecular sieve component of the formula

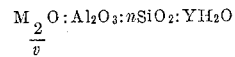

In the formula, M is a cation (e.g., a metal in groups I, II and III of the periodic table, transition metals of the periodic table, hydrogen, ammonium or mixtures of the aforementioned), $v$ is the valence of M, $n$ is a number having a value of at least 2 and Y is a variable depending upon the number of mols of $SiO_2$ and the identity of M. The species of molecular sieve in the product can be identified by standard X-ray diffraction technique. The quantity of crystalline sieve can also be estimated by means of X-ray diffraction patterns.

In accordance with a preferred embodiment of this invention, hard stable catalyst agglomerates are produced from a mixture of sodium hydroxide solution and three forms of clay; namely (1) metakaolin, (2) kaolin which has been calcined at a temperature and for a time such that the clay undergoes the characteristic kaolin exotherm at about 1800° F. after dehydration is substantially complete and (3) uncalcined (fully hydrated) kaolin clay. In other words, in accordance with this form of the invention, the reaction masses are obtained from a mixture of uncalcined fully hydrated kaolin clay and two distinctly different anhydrous forms of kaolin clay. The reacted agglomerates contain a crystalline phase having substantially the X-ray diffraction pattern of sodium zeolite Y as described in U.S. 3,130,007 to Breck or zeolite X as described in U.S. 2,882,244 to Milton. The resulting composite base material is base-exchanged to remove alkali cations and then calcined to activate the composite. A characteristic of such catalyst composites is that they are remarkably selective even at exceptionally high conversion levels and possess remarkable steam stability. Another noteworthy feature of the catalysts is that they operate with the desirable selectivity characteristics of the fresh catalyst even when the catalytic activity decreases during service. Thus, the catalysts do not acquire the cracking characteristics of the dehydrated kaolin clay diluent. This, of course, is not true of prior art composite catalysts that contain catalytically active gel matrices. Another characteristic of catalysts of the invention is that they can be produced as very hard shaped masses. The calcined clay mixture appears to contain some nonreactive constituents which, it is believed, contribute to the remarkable hardness of catalyst composites obtained with such ingredients. Typically, the catalysts have bulk densities within the range of 0.80 to 1.00 g./cc.

Following is a more detailed description of reactants useful in carrying out our invention, following which a description of reaction conditions is given.

REACTANTS (1) *The source of soluble alkali metal oxide*

Sodium hydroxide can be used as the source of all of the alkali metal oxide. In producing certain molecular sieves it may be necessary to employ potassium hydroxide, lithium hydroxide, mixtures thereof and mixtures with sodium hydroxide. Quaternary ammonium base can be used. It is also within the scope of the invention to employ soluble alkali metal silicate as a source of soluble alkali metal oxide. The meta-silicate or the disilicate can be used. Mixtures of alkali metal hydroxide and alkali metal silicate can be employed.

The source of alkali metal oxide is used in the form of an aqueous solution. Employing sodium hydroxide, aqueous solutions of 10 percent to 45 percent NaOH concentration (weight basis) are used. Solutions of 10 percent to 30 percent sodium hydroxide concentration are especially useful in producing catalyst composites by reaction with calcined kaolin in the presence of raw clay. At sodium hydroxide concentrations appreciably below 10 percent, the desired zeolite may not form in the presence of raw kaolin clay diluent since the raw clay may inhibit formation of the desired zeolite under these circumstances. At sodium hydroxide concentrations appreciably above 35 percent there may be insufficient liquid phase to form coherent particles unless a larger quantity of sodium oxide is employed. The use of large quantities of sodium oxide may, however, prevent the formation of high silica-to-alumina ratio zeolites which are generally preferred for cracking catalyst preparations. Especially good catalysts have been prepared from mixtures of calcined kaolin clay, aqueous solutions of 12 percent to 18 percent sodium hydroxide concentration and raw kaolin clay.

Using sources of alkali metal oxide other than sodium hydroxide, solutions of corresponding metal oxide concentrations are suggested.

A freshly prepared concentrated aqueous solution of sodium aluminate can be employed as a source of some of the sodium oxide, especially when a highly absorptive, particulate source of alkali-reactive silica, such as silica gel or diatomaceous earth, is used as the source of silica.

(2) *Sources of reactive silica and alumina*

The sources of reactive silica and alumina should include a substantial amount of finely-divided absorptive material, preferably finely divided mineral matter. Examples of finely divided absorptive mineral matter which are sources of alumina and/or silica are calcined kaolin clay, bauxite, diatomaceous earth and tripoli. Also useful are amorphous alkali-reactive silica, such as silica gel and the silica residue obtained by removing cations other than silica from a silicate mineral having a continuous network, e.g., a silica residue obtained by acid leaching of a clay. Preferably, finely divided calcined kaolin clay that has been calcined to a L.O.I. below 1 percent is employed as a reactant to produce the zeolite. The term "L.O.I." refers to loss on ignition and is determined at 1800° F.

Calcined clays that are especially useful are supplied commercially as finely divided white pigments. These clays are available in two grades. One is a minus 325 mesh (Tyler) product of very high whiteness as compared with the whiteness of the raw kaolin clay from which it is obtained. Such calcined clay usually has a G.E. brightness of at least 90 percent. This material, exemplified by the material supplied under the trade name "Satintone #1," is prepared by calcining minus 325 mesh degritted kaolin clay to an L.O.I. below 1 percent at a temperature of about 1600° F. to 2000° F. and for a time such that the clay completes (passes through) the characteristic exotherm at about 1800° F. after dehydration is substantially complete. The high temperature calcined clay is obtained at calcination temperatures below which substantial crystallization of high temperature phases, such as cristobalite and/or mullite takes place. The use of the high temperature calcined clay pigment leads to the crystallization of zeolitic molecular sieves of relatively large pore diameter and high silica-to-alumina ratio, e.g., type X and Y zeolites, and is especially desirable for producing cracking catalyst composites. The other type of commercial calcined kaolin clay is a minus 325 mesh dehydrated amorphous aluminum silicate obtained by calcining clay to an L.O.I. below 1 percent at a temperature and for a time such that the clay has not undergone the exothermic reaction at about 1800° F. Such clay, exemplified by "Satintone #2," is frequently referred to as "metakaolin" and usually has a lower brightness (typically 83 percent to 85 percent) than the clay from which it was obtained. Metakaolin can be obtained by calcining kaolin clay at a temperature within the range of about 1000° F. to about 1550° F. until the L.O.I. of the clay is below 1 percent. It is also within the scope of this invention to employ partially dehydrated clay which has been calcined under conditions that produce a mixture of hydrated clay and metakaolin. To prepare a cracking catalyst from such a mixture and sodium hydroxide solution the reaction masses should also contain calcined clay that has passed through the exotherm during the calcination.

Calcined kaolins containing the usual impurities can be used. Typically the calcined clays may contain 1 percent to 2 percent $TiO_2$, small amounts of ferruginous matter and quartz. Metakaolin can be distinguished from other forms of anhydrous kaolin clay by the fact that it undergoes the characteristic exotherm when heated to about 1800° F. for a sufficient time. The presence of the exotherm can be determined by a differential thermal analysis, using the technique described in Grim's "Clay Mineralogy," page 203, published by McGraw-Hill Book Company, Inc. (1953).

Metakaolin is a reactive source of alumina and silica. When mixed with concentrated sodium hydroxide solution and subjected to hydrothermal treatment without dehydration, as described in U.S. 3,065,054 to Haden et al., sodium zeolite A is crystallized. In carrying out an embodiment of the process of the invention, raw kaolin clay is mixed with metakaolin and sodium hydroxide of suitable concentration to produce composites including zeolite A. When metakaolin is reacted with sodium silicate in the presence of raw kaolin clay, as shown in the accompanying examples, composites containing sodium zeolite X or Y are obtained. When the metakaolin is employed with sodium hydroxide solution and a substantial amount of kaolin that has been calcined above the exotherm, the formation of sodium zeolite X or Y is favored. Composites containing a high silica-to-alumina ratio form of zeolite Y can be obtained from these components by employing a large percentage of high temperature calcined clay with metakaolin, sodium hydroxide solution and raw kaolin clay. While high silica-to-alumina ratio zeolites can be crystallized in the presence of raw kaolin clay by reacting the high temperature calcined clay and sodium hydroxide solution without metakaolin, the quantity of zeolite crystallized in the presence of raw kaolin is generally improved to a substantial extent by employing a mixture of the calcined clays with the caustic and raw kaolin. The calcined clays can be mixtures of two different types of clays obtained in separate calcination operations or the mixture can be obtained in a single calcination operation.

It is reasonable to expect that a freshly prepared aqueous solution of sodium aluminate can be used as the sole or partial source of reactive alumina, especially when such material is used in conjunction with a particulate adsorptive source of high purity silica, such as silica gel or tripoli. However, the use of a mineral source of reactive alumina, especially calcined kaolin clay, is preferred.

(3) Uncalcined clay

A clay consisting predominantly of kaolinite (or equivalent dickite, anauxite, nacrite or halloysite) is used. Bentonite clay and attapulgite clay are not suitable. A kaolinite having good extrusion properties should be used when particle formation is to be accomplished by such means. Excellent results have been realized with water-washed white kaolin clays from Georgia. The uncalcined clay that is used possesses the fundamental characteristics of the clay as mined and is therefore usually referred to as "raw" kaolin. Such material may have undergone purification by any one of the following: degritting, fractionation, bleaching, flotation, or other procedure for removing impurities.

PROPORTION OF REACTANTS

The composition of our reaction masses will, of course, vary with the particular sieve-type zeolite that is desired and with the desired dilution of such sieve in the end product.

The reaction masses may be considered to contain two groups of ingredients. The ingredients that would form a zeolite in the absence of raw kaolin may be considered to constitute one group and include alkali metal oxide, reactive silica, reactive alumina and water. Raw kaolin and a supplemental quantity of alkali metal oxide constitute the other group.

The first group is selected to provide a mix which will crystallize hydrothermally to form a zeolitic molecular sieve of desired species in the absence of raw clay. The raw kaolin is employed in amount to thicken the other ingredients. The quantity of alkali metal oxide in the second group of ingredients will vary somewhat with raw clay of different origin and particle size. Typically, this amount is within the range of 0.05 mols to 0.50 mols alkali metal oxide per mol raw clay ($Al_2O_3.2SiO_2.2H_2O$). For example, a slurry of suitable calcined clays and sodium hydroxide solution of 12 percent to 18 percent concentration can form high purity sodium zeolite Y of about 4 silica to alumina ratio (as determined by X-ray) using 0.40 to 0.65 mols $Na_2O$ per mol $Al_2O_3$ in the calcined clays. When these materials are reacted in the presence of a typical raw clay, in accordance with the present invention, about 0.45 to 0.75 mols of $Na_2O$ per mol calcined clay would be used. By way of further example, type A zeolite can be crystallized in massive form from ingredients of the first group using proportions of 1 mol metakaolin and a sodium hydroxide solution of 30 percent to 55 percent concentration in amount to provide 1 mol $Na_2O$ per mol of metakaolin. Reference is made to U.S. 3,065,054 to Walter L. Haden, Jr. and Frank J. Dzierzanowski. Similarly, type A zeolite can be crystallized in massive form from a slurry of particulate amorphous silica, such as silica gel, and a concentrated freshly prepared aqueous solution of sodium aluminate, as described in U.S. 3,094,383 to Haden et al. To make type A adsorbent composites of the invention from the metakaolin and a concentrated sodium hydroxide solution, the reaction masses can be formulated as follows:

| Ingredient: | Quantity |
|---|---|
| (1) Kaolin dehydrated substantially completely at a temperature below the kaolin exotherm | 1 mol (calculated as $Al_2O_3.2SiO_2$) |
| (2) Uncalcined kaolin clay | 1/25 to 1/2 mol (calculated as $Al_2O_3.2SiO_2.2H_2O$) |
| (3) NaOH as aqueous solution, preferably of 30 percent to 45 percent concentration | To supply 1 mol $Na_2O$ plus 0.05 to 0.80 mol $Na_2O$ per mol (2) and of a concentration sufficient to thicken (1) and (2) |

Hydrothermal treatment of the ingredients enumerated above results in the formation of composites composed of a major amount of molecular sieve having substantially the X-ray diffraction of zeolite A, as described in U.S. 2,841,471 to Sensel. The composites also contain unreacted crystalline kaolin. When heat activated, the particles have less tendency to disintegrate in water than self-bonded particles of similar size and shape made without raw clay present during reaction.

In producing catalysts from sodium silicate, metakaolin and uncalcined kaolin, the following proportions are suggested:

| Ingredient: | Quantity |
|---|---|
| (1) Metakaolin | 1 mol (calculated as $Al_2O_3.2SiO_2$) |
| (2) Uncalcined kaolin clay | 1 to 30 mols (calculated as $Al_2O_3.2SiO_2.2H_2O$) |
| (3) Sodium silicate as aqueous solution | To supply 1 mol $Na_2O$ per mol (1) and 0.05 to 0.80 mol $Na_2O$ per mol (2); and to supply 0.5 to 3.5 mols $SiO_2$ |

Composites containing synthetic faujasite (zeolite X or zeolite Y) can be obtained from mixtures of aqueous sodium hydroxide solution, calcined kaolin clay and uncalcined kaolin clay having compositions falling within the following range:

| | Parts by weight |
|---|---|
| Uncalcined kaolin clay | 100 |
| Substantially anhydrous amorphous calcined kaolin clay | 5 to 100 |
| Aqueous sodium hydroxide of 10 percent to 30 percent concentration, preferably 10 percent to 20 percent concentration | to make a plastic mixture with the above and to supply 0.45 to 1.20 mols $Na_2O$ per mol $Al_2O_3$ in the calcined kaolin clay |

For every 100 parts by weight of total calcined kaolin clay in the composition given immediately above, the proportion of metakaolin to the high temperature dehydrated kaolin clay falls within the range of 0 to 100 parts by weight of metakaolin to 100 to 0 parts by weight of high temperature calcined clay. When all of the calcined kaolin is in the form of metakaolin, the reaction mass must be aged for extremely long periods at room temperature in order to crystallize synthetic faujasite. As mentioned, above, when all of the calcined clay is in the form of the high temperature calcined clay, less crystallization results for a given aging and crystallization period than when mixtures of the calcined kaolin clays are used.

Particularly good results have been realized when the sodium hydroxide concentration in the reaction mixture has been selected to provide slightly in excess of ½ mol $Na_2O$ per mol total $Al_2O_3$ in the calcined clays. The use of about 0.50 to 0.75 mol $Na_2O$ per mol $Al_2O_3$ in the calcined clays is recommended. When less than about ½ mol $Na_2O$ is used, the masses do not crystallize as readily as when more $Na_2O$ is present. When excessive $Na_2O$ is present, the nature of the zeolite is affected and this in turn adversely affects the catalytic properties of the finished catalyst.

In carrying out the preferred form of our invention wherein sodium hydroxide solution is employed with a mixture of calcined koalin clays and raw kaolin clay to produce a composite including synthetic faujasite, suitable reactants are as follows:

| Ingredient: | Quantity |
|---|---|
| (1) Metakaolin | 1 mol (calculated as $Al_2O_3.2SiO_2$) |
| (2) Kaolin clay dehydrated substantially completely and calcined at a temperature sufficient to complete (pass through) the kaolin exotherm | ½ to 10 mols, most preferably 3 to 7 mols (calculated as $Al_2O_3.2SiO_2$) |
| (3) Uncalcined kaolin clay | At least combined amounts of (1) and (2) (on a weight basis) |
| (4) Aqueous NaOH solution of 10 percent to 30 percent concentration, preferably 10 percent to 20 percent concentration | To supply 0.45 to 1.2 mols $Na_2O$, preferably 0.50 to 0.75 mols $Na_2O$ per mol $Al_2O_3$ in combined amounts of (1) and (2) |

The ratio of metakaolin to the high temperature calcined clay in the reaction mixture affects the nature of the zeolite and the properties of the product, especially the thermal stability of the product. Within the preferred limits of 3 to 7 mols high temperature calcined clay to 1 mol metakaolin and 0.50 to 0.75 mol $Na_2O$ per mol $Al_2O_3$ in the calcined clays, high silica-to-alumina ratio (by X-ray) sodium zeolite Y is crystallized and highly active and selective catalysts are obtained. These catalysts have excellent steam stability at temperatures of 1350° F. and above. Especially preferred is the use of about 5 to 7 mols of the high temperature calcined clay to 1 mol of metakaolin. The use of these proportions results in catalysts that are stable in the presence of steam at temperatures as high as 1550° F. or 1600° F. Using mol ratios of high temperature calcined clay to metakaolin appreciably less than 3 to 1, the catalysts may not be as stable when steamed at temperatures above 1350° F. as catalysts obtained with a higher proportion of the high temperature calcined kaolin clay. On the other hand, when using ratios of high temperature calcined kaolin clay to metakaolin appreciably higher than 7 to 1, less crystallization may result than when employing the preferred ratio of calcined clays.

A process for synthesizing faujasite zeolites from a mixture of metakaolin, high temperature calcined kaolin clay and sodium hydroxide solution is claimed in our copending application Serial No. 347,134, filed February 25, 1964. The synthesis of high silica-to-alumina ratio form of type Y zeolite using preferred proportions of the aforementioned reactants is claimed in our copending application Serial No. 397,277, filed September 17, 1964. The synthesis of faujasite from sodium hydroxide solution and high temperature calcined clay per se is claimed in our copending application Serial No. 416,925, filed December 8, 1964.

FORMATION OF REACTION MASSES

The solids should be minus 200 mesh particles, preferably finer, unless the material is in the form of a pulverulent mass which will break down into minus 200 mesh particles during mixing. We may employ apparatus such as a pug mill to obtain the necessary uniform mixture of ingredients. One method for forming our mixture is to dry blend the sources of reactive silica and alumina, such as a mixture of kaolin calcined below the exotherm and kaolin calcined above the exotherm, incorporate alkali solution at ambient temperature and then adjust the mass to a consistency suitable for particle formation by addition of uncalcined clay. This mass can be reacted in bulk and subsequently granulated into particles of the desired form or shape. Preferably, however, we form our reaction mass into particles of the shape and form desired in the finished catalyst or contact mass since such form will be retained through processing. Inasmuch as our reaction masses contain appreciable quantities of uncalcined kaolin clay diluent, these masses are readily amenable to particle formation by simply forming means such as extrusion when we select a kaolin having good plasticity. In the absence of the uncalcined clay ingredient, the reactants required for sieve formation lack plasticity and therefore would be extremely difficult to pelletize by extrusion or other forming method requiring the use of plastic mixtures. If desired, extruded green pellets can be rounded by tumbling before they harden as a result of chemical reaction. Particle forming methods other than extrusion can be used to form the agglomerates. As examples of other forming methods can be mentioned molding, pilling and spray drying. It is also within the scope of the invention to agglomerate the solids on a rotating pan (e.g., a Dravo mill). For fluid bed operations 100/325 mesh particles are formed. For most moving bed catalyst operations, the particles should be from about 4 to 8 mesh (Tyler).

REACTION

The agglomerated reaction masses are reached under conditions to prevent dehydration at suitable temperatures until the desired synthetic zeolite has formed. Suitable temperature or temperatures used to react the ingredients and to form the desired zeolite will vary with the ingredients, especially with the concentration and amount of sodium oxide present. With some reaction mixtures it will be possible to heat the freshly prepared masses to product temperatures within the range of 150° F. to 200° F. under pressure sufficient to prevent dehydration and maintain the masses at temperatures with this range for a time up to 48 hours or until the synthetic zeolite forms. Further heating of the masses under conditions to prevent dehydration will normally not be detrimental. In the case, however, of reaction masses formulated with fairly dilute sodium hydroxide solutions, e.g., solutions having a NaOH concentration of about 10 percent, the masses should be aged by maintaining them at product temperatures with the range of about 70° F. to 130° F. for at least about 4 hours, preferably 12 to 24 hours, before heating the masses without dehydration at temperatures within the range of 150° F. to 200° F. for 12 to 48 hours, or until the zeolite forms. Reaction masses formulated with sodium silicate as the source of sodium oxide do not appear to be impaired by being heated immediately to temperatures of 150° F. to 200° F. under pressure sufficient to prevent appreciable evaporation of water from the reactants.

The progress of the reaction can be followed by studying the properties of the reactant masses. The presence of the desired molecular sieve can be detected by adsorption studies or by catalytic evaluations on ion-exchanged, activated samples. In many cases X-ray diffraction studies can be used to detect the presence of a molecular sieve and also to estimate the quantity of sieve. X-ray patterns of the unactivated reaction products will usually contain kaolinite peaks and also peaks characteristic of crystalline impurities usually associated with kaolin clays.

As mentioned, reaction is carried out under conditions such as to prevent dehydration of the particles. Therefore, when heating the reaction masses the vapor pressure in the reaction vessel must be at least as great as the vapor pressure generated by the reactants at the particular heating temperature employed. The simplest methods for carrying out the reaction utilize autogenous pressure. One method is to carry out the reaction in an unvented heated vessel. Another means of maintaining the particles under substantially autogenous pressure while they are being heated is to immerse the particles in a nonreactive hydrocarbon oil heated to the desired temperature. Pressures substantially greater than autogenous can be used. The aging temperature, especially the initial aging temperature, may affect the species of zeolite that crystallizes from a given reaction mass. For example, either type A zeolite or faujasite type zeolites can be crystallized from certain reaction masses by controlling the temperature at which reaction is initiated. When certain reaction masses are heated very rapidly to product temperatures above about 150° F. under autogenous pressure, type A zeolite may be formed although the reaction masses are formulated with a sufficient quantity of a source of reactive silica to form faujasite-type zeolites. By maintaining such masses at temperatures not appreciably exceeding 100° F. for several hours (e.g., 4 to 24 hours) before heating under autogenous pressure to temperatures of 150 to 200° F. for 8 to 24 hours, a synthetic faujasite is formed.

To convert the hydrous products into active contact masses, the molecular sieve portion of the products must be at least partially dehydrated by calcination at temperatures within the range of about 600° F. to 1400° F. and for times within the range of ½ to 24 hours. When the active contact mass is a cracking catalyst, the clay diluent as well as the zeolite should be dehydrated. The crystallized products can be ion-exchanged before or after the calcination, preferably before calcination. To produce catalysts, it may be desirable to exchange a substantial amount of the alkali metal ions of the zeolite. In producing catalysts, the following ionizable compounds can be used to replace the alkali metal of the zeolite: salts of barium, calcium, magnesium, manganese, vanadium, chromium, cerium, cobalt, nickel, iron, zinc, aluminum, rare earths (lanthanum, praesodymium, neodymium and samarium), hydrogen, ammonium and mixtures of the foregoing. The salts can be inorganic, such as the chloride, or organic, such as the acetate. Normally, the ionizable salt will be used in the form of an aqueous solution. Conditions for base-exchanging alkali metal aluminosilicates, especially alkali metal aluminosilicates of the molecular sieve type, are well known. Known conditions of time and temperature can be used in carrying out the ion-exchange. To activate the ion-exchanged agglomerates and produce a catalyst, the agglomerates are calcined in air at temperatures usually within the range of about 900° F. to 1100° F. and for times within the range of ½ to 24 hours. The activation can be carried out in a cracking unit of a refinery or the particles can be activated before use in the cracking unit. It may be desirable to give the catalyst a finishing treatment by heating the catalyst particles in the presence of steam to a temperature within the range of 1000° F. to 1500° F. to adjust the activity to a desired level. Steaming at 1000° F. to 1450° F. with 100 percent steam for 1 to 4 hours is especially recommended for such activity adjustment.

As mentioned, we preferably ion-exchange the reacted masses before thermal treatment and subsequently dehydrate the ion-exchanged masses by calcination. Using this sequence, substantially all of the alkali in the particles, including the alkali associated with the uncalcined kaolin clay, can be exchanged. A typical calcium-exchanged catalyst obtained in this manner and formulated to contain about 10 percent type Y sieve contained about 7 percent by weight CaO and appreciably less than 1 percent Na$_2$O. When a similar reaction mass was dehydrated before exchanging with calcium ions, a catalyst containing about 5 percent Na$_2$O and 2 percent CaO was obtained. The latter catalyst was poor in activity and in steam stability, as compared to the catalyst in which exchange was carried out before dehydration.

Catalysts of the present invention containing faujasite-type molecular sieves are useful for cracking hydrocarbon oils of the type used as catalytic cracking feedstocks. The cracking operation can be carried out at catalyst temperatures of about 800° F. to about 1000° F. with pressures from 1 to 4 atmospheres (absolute). These catalysts are especially useful in cracking to high conversion levels, i.e., conversion levels above about 55 percent. The catalysts of this invention are highly selective, even at exceptionally high conversion levels. This fact is evident from the exceptionally high gasoline yields and desirably low coke and gas yields. Coke yield is usually appreciably less than that of commercial kaolin catalyst at the same conversion.

The following examples are given to illustrate this invention and certain features thereof.

The following kaolin clays were used in the preparations described in the examples.

| Physical Characteristics | Satintone #1 | Satintone #2 | ASP 200 |
| --- | --- | --- | --- |
| Specific Gravity | 2.63 | 2.50 | 2.58 |
| Moisture, Maximum Wt. percent | 1.0 | 1.0 | 1.0 |
| Wt. percent +325 mesh (wet screen) | 0.5 | 0.5 | 0.01 |
| Average Particle Size, Microns | 2.0 | 4.5 | 0.55 |
| pH | 5.8–6.3 | 5.8–6.3 | 3.8–5.0 |
| Typical Chemical Analysis (Moisture-free Weight Basis): | | | |
| Ignition Loss at 1,800° F., percent | 0.5 | 0.9 | 13.8 |
| Silica, percent | 52.3 | 52.1 | 45.4 |
| Alumina, percent | 44.6 | 44.4 | 38.8 |
| Iron Oxide | 0.4 | 0.4 | 0.3 |
| Titanium Dioxide, percent | 2.0 | 2.0 | 1.5 |
| Calcination Treatment | [1] Calcined | [2] Calcined | Uncalcined |
| Composition | [3] Amorphous | [4] Amorphous | [5] Crystalline |
| Whiteness (G.E.), percent | 90 | 85 | 87 |

[1] Above exotherm.
[2] Below exotherm.
[3] Possibly incipient mullite.
[4] Metakaolin.
[5] Kaolinite.

The "Edgar Plastic Kaolin" and "Putnam" clay used in some of the examples are similar to ASP 200 but are somewhat finer in particle size and possess greater plasticity. These clays are described in U.S. 2,489,332 to Hubert A. Shabaker. "Min-Chem Special" clay is similar to "ASP 200" in chemical composition but has an average particle size of about 3.5 microns.

The hardness of catalyst pellets produced in accordance with this invention was measured by the so-called "4-ball"

hardness test, a test widely employed in evaluating the resistance of catalyst particles to physical disintegration when subjected to the action of very strong attritive forces. In carrying out the hardness tests, plus 5 mesh (Tyler) test sample previously calcined at 1050° F. and stored in a desiccator was poured into a tared 100 cc. graduate cylinder to the 80 cc. mark, with gentle tapping to pack the particles and the weight of 800 cc. of the sample determined. 80 cc. of sample was placed into a stainless steel cylindrical container with four polished stainless steel ball bearings, each of 1/16" diameter. The container was closed tightly and it was then rotated about its longitudinal axis on a roller arrangement at about 80 r.p.m. for one hour. After rotation had ceased, the particles in the container were screened on a limiting sieve (a 6 mesh sieve) and the hardness calculated as the percentage of total sample weight represented by the fraction of the material retained on the limiting sieve.

Catalytic data mentioned herein were obtained in a cracking test unit designed to evaluate the activity of a cracking catalyst at standard conditions. This test, referred to as the "CAT-D" test, is a modification of the "CAT-A" method described in "Laboratory Method for Determining the Activity of Cracking Catalysts," by J. Alexander and H. E. Shimp, page R537, National Petroleum News, Aug. 2, 1944. In carrying out the CAT-D test a heavy gas oil feedstock is used and cracking is carried out at 900° F. with 10 percent steam and a liquid space rate of 1.0 (volume charge/volume of catalyst/hour) for a 15 minute operation period.

The term "kaolin coke factor" used in presenting comparative catalytic data refers to a value obtained by comparing coke made of the experimental catalyst to that of commercial kaolin catalyst at the same conversion (extrapolated.)

The commercial catalyst was obtained by reacting kaolin clay with sulfuric acid followed by reductive desulfation. The commercial catalyst contained about 45 percent $Al_2O_3$, the balance being substantially $SiO_2$.

All X-ray diffraction data referred to in these examples were obtained from random powder patterns using the K-alpha doublet of copper as the source of X-radiation, a receiving slit width of 0.006", a Norelco specimen holder having a sample area of 0.812" x 0.408", a 3° take-off angle, a scintillation counter, a scanning rate of 2° per minute, a time constant of 4 seconds, a scanning direction increasing from 2° to 90°, and a strip chart pen recorder. Specimens were equilibrated at 25° C. and 40 percent to 50 percent relative humidity for at least 18 hours prior to X-raying. Peak heights (counts per second, or c./s.") and positions were recorded on the strip chart.

In view of the similarity between the diffraction patterns of the X and Y molecular sieves, each of which has a characteristic maximum at 6.2 $2\theta$, the X zeolite was distinguished from Y zeolite by applying to X-ray powder diffraction patterns of products the criterion set forth in Table III of a publication by Donald C. Freeman, Jr., entitled "Electrical Conductivity of Synthetic Crystalline Zeolites," Journal of Chemical Physics, vol. 35 No. 3, September 1961. Table III in said publication correlates unit cell dimension with $SiO_2/Al_2O_3$ ratio. To make a determination as to zeolite identity, the peak located at about 31° $2\theta$ on the powder diffraction pattern of a sample was observed. If such peak was located below 31.12° $2\theta$, corresponding to a $SiO_2/Al_2O_3$ ratio of 3.00 as shown in Table III of the publication, the zeolite was identified as X. If the peak at about 31° $2\theta$ was located at or above 31.13° $2\theta$, the zeolite was identified as Y.

In estimating percent crystalline zeolite of products, a commercial sample of type 13X zeolite was used as a reference. This sample, assumed to contain 100 percent zeolite, had a 6.2° $2\theta$ peak height of 880 c./s. Percent sieve in samples was estimated by observing the intensity of the 6.2° $2\theta$ peak in c./s. and multiplying such value by the factor 100/880.

*Example 1*

This example illustrates the preparation, in accordance with our invention, of a highly selective and active cracking catalyst containing the calcium form of type X synthetic zeolite in the presence of dehydrated kaolin diluent.

A reaction mass was obtained by forming a uniform mixture of the following ingredients:

| Component: | Grams |
|---|---|
| Satintone #1 | 126.0 |
| Satintone #2 | 333.0 |
| Edgar Plastic Kaolin | 1430.0 |
| 26% aqueous NaOH solution (density 1.28) | 688.6 |

Initially the two Satintones were dry blended and then mixed with sodium hydroxide solution in a worm-type pug mill. The sodium hydroxide solution was at room temperature when it was incorporated with the calcined clays. The plastic kaolin was added to the mixture of calcined clay and alkali solution. Total pugging time was about 50 minutes. The mixture was then extruded in a piston-type extruder having 0.17" diameter holes. The extrudate was cut into pellets about 0.25" long as they issued from the extruder. The pellets were immersed in a circulating bath of white mineral oil and maintained there for 24 hours. The oil temperature was maintained at 100° F. during this time. The pellets were then placed in a jar and covered with some of the hot white mineral oil. The jar was sealed and held in a 200° F. oven for 24 hours to crystallize the zeolite.

An X-ray diffraction pattern of the aged pellets indicated that type X zeolite was the only crystalline zeolite present. Kaolinite was also present as a crystalline phase, as was expected. The height of the characteristic faujasite peak at 6.2° $2\theta$ was 96 c./s. From this data it was estimated that the pellets contained about 11 percent type X zeolite (hydrated sodium form), the balance being kaolinite and an amorphous aluminum silicate phase derived from the calcined clay.

This intermediate was then washed by percolation with 4825 ml. of water at room temperature, producing an effluent having a pH of 10.8. The washed pellets were base exchanged with 1.06 N calcium chloride solution by percolating 6400 ml. of the exchanging solution through the pellets at 180° F. The pellets were then washed with 3000 ml. of distilled water at room temperature and dried at 200° F. for two hours. The L.O.I. of the product was 19.09 percent. An X-ray diffraction indicated that the product contained a mixture of type X zeolite and kaolinite.

To convert the pellets into an active cracking catalyst, the pellets were calcined in air in a muffle furnace at 1050° F. for three hours. A chemical analysis of the calcined catalyst product indicated it had the following composition:

| | Volatile free basis, weight percent |
|---|---|
| CaO | 6.75 |
| $Na_2O$ | 0.19 |
| $Al_2O_3$* | 42.8 |
| $SiO_2$* | 50.3 |

* Calculated from analyses of clay reactants.

X-ray diffraction studies of the catalyst indicated that the dehydrated type X zeolite (molecular sieve) was the only crystalline phase present in substantial quantity. The pattern indicated the presence of a small amount of residual kaolinite, indicating that most of the crystal structure of the clay had been destroyed by the heat treatment.

The 4-ball hardness of the catalyst pellets (+6 mesh fraction) was found to be 97.3 percent, a value comparing favorably with the commercial 4-ball hardness of some commercial cracking catalysts.

Catalyst density was 0.92 g./cc.

The catalyst was steamed at 1350° F. for four hours, using 100 percent steam and evaluated for cracking properties. A comparison of the intensity of the 6.2° 2θ line of the pellets before and after the steam stabilization treatment indicated that the steaming destroyed about half of the crystal structure of the zeolite and it was estimated that the steamed catalyst contained about 5 percent crystalline molecular sieve (type X).

The CAT–D properties of the experimental catalyst and a sample of the commercial kaolin cracking catalyst were compared. The results of the comparison are summarized in Table I.

TABLE I

[Catalytic evaluations (CAT-D Test) of catalysts derived from kaolin clay]

|  | Experimental Kaolin Catalyst | Commercial Kaolin Catalyst |
| --- | --- | --- |
| Gasoline, vol. percent | 53.0 | 35.8 |
| Coke, wt. percent | 4.2 | 3.8 |
| Gas, wt. percent | 17.0 | 18.2 |
| Conversion, wt. percent | 67.8 | 53.5 |
| Gas Gravity (Air=1.0) | 1.5 | 1.4 |
| Kaolin Coke Factor | 0.58 | 1.0 |
| Cracking Efficiency, percent (w./w.) | 68.7 | 59.0 |

Data in Table I show that under identical test conditions the experimental kaolin catalyst was considerably more efficient as a cracking catalyst than the commercial acid-activated kaolin catalyst (68.7 percent efficiency for the experimental catalyst as compared with only 59.0 percent efficiency for the commercial catalyst). The experimental catalyst converted 67.8 percent of the feedstock, producing a 53.0 percent gasoline yield. The low "Kaolin Coke Factor" of the experimental catalyst is a further indication of its outstanding selectivity. Another desirable feature of the experimental catalyst was that the gas product had a very high specific gravity, indicating that $C_3$ and $C_4$ olefins were produced instead of hydrogen, which would have reduced gas gravity.

*Example II*

This example illustrates the preparation of selective and stable catalyst from a mixture of three forms of kaolin clay and alkali solution, in accordance with this invention. The procedure of Example I was repeated using the following starting materials.

| Component: | Parts by weight |
| --- | --- |
| Satintone #1 | 237 |
| Satintone #2 | 222 |
| ASP 200 | 1160 |
| 18.7% NaOH solution | 643 |

Mixing was in a water cooled pug mill and was carried out by dry blending the calcined kaolines, as in Example I, adding NaOH solution (at room temperature) and then uncalcined clay. Extrusion was in the piston extruder. The pellets were aged for 24 hours by immersing them in mineral oil maintained at 100° F. The pellets and some of the hot oil were transferred to a glass jar and the jar was sealed. The sealed jar with the pellets was held in a 200° F. oven for 24 hours to crystallize the zeolite.

The pellets were then washed, exchanged with 1.06 N calcium chloride solution and rewashed, as in the previous example. The exchanged pellets were then dried at 200° F. for 3 hours, calcined at 1050° F. in a muffle furnace for 3 hours and steamed at 1350° F. for 3 hours with 100 percent steam.

An X-ray pattern studied in conjunction with the article in Journal of Chemical Physics showed that in addition to a small amount of residual kaolinite the only crystalline phase present was type Y zeolite.

Data for the catalytic properties of the pellets are summarized in Table II.

*Table II.—Catalytic evaluation of experimental catalyst*

| | |
| --- | --- |
| Gasoline, vol. percent | 57.9 |
| Coke, wt. percent | 3.1 |
| Gas, wt. percent | 16.9 |
| Conversion, wt. percent | 71.0 |
| Gas gravity (air=1.0) | 1.53 |
| Kaolin coke factor | 0.37 |
| Cracking efficiency, wt. percent | 71.8 |

These data show that the calcium-sieve composite was an extremely active and selective catalyst.

The catalyst was then steamed at 1400° F. for 3 hours and retested by the CAT–D test. The catalyst was found to be substantially unchanged in activity and selectivity, indicating that it was still stable after the 1400° F. steam treatment.

*Example III*

Still in accordance with this invention, a molecular sieve type cracking catalyst of outstanding steam stability was formed by crystallizing type Y zeolite from reactants including sodium metasilicate solution, metakaolin and uncalcined kaolin clay.

An 18 percent aqueous solution of $Na_2SiO_3$ was prepared by heating 502.0 grams $Na_2SiO_3.9H_2O$ in 698 ml. distilled water and mixing until the sodium silicate had dissolved. The solution was permitted to cool to room temperature. Satintone #2 was mixed thoroughly in a pug mill with this cooled solution, using 90.0 grams of Satintone #2 and 822.0 grams of the 18 percent sodium silicate solution. 1800.0 grams of ASP 200 was then pugged into the mixture. Total pugging time was 40 minutes. The mixture was then extruded in a piston extruder having 0.17″ diameter openings. The extrudate was cut into pellets about 0.25″ long as they issued from the extruder.

(a) A portion of the pellets was immersed in a circulating bath of white mineral oil maintained at 100° F. Pellet retention time was 24 hours. The pellets were placed in a glass jar, covered with some of the hot oil and the jar sealed. The jar was placed in a 200° F. oven and maintained in the oven for 24 hours. Oil was drained from the reacted pellets and they were washed with distilled water at room temperature until the pH of the effluent was 10.9. The pellets were then exchanged at 180° F.±10° F. with 1.06 N $CaCl_2$ solution until the aqueous effluent had a $Na_2O$ content of 0.03 g./100 ml. The exchanged pellets were then washed with distilled water until the effluent was chloride-free. The pellets were dried at 300° F. and calcined at 1050° F. in a muffle furnace for 3 hours. A chemical analysis of the product indicated that it contained 0.24 percent $Na_2O$, 2.98 percent CaO and 16.0 percent L.O.I. From the fact that the 6.2° 2θ peak on the X-ray pattern had an intensity of 51 c./s., it was estimated that the catalyst contained 5.8 percent crystalline type Y zeolite.

The exchanged pellets were steamed at 1350° F. for 4 hours with 100 percent steam. A CAT-D test was run on the steamed pellets. To evaluate stability of the pellets, the pellets were steamed at 1400° F. for 4 hours and another CAT-D test was made. This procedure was repeated with steam treatments at 1400° F., 1450° F., and 1500° F., each steam treatment being for 4 hours with 100 percent steam. Results tabulated in Table III show that the material was a very active and selective cracking catalyst even after the 1500° F. steam treatment.

TABLE III
[Stability of experimental catalyst]

| Steam Treatment, °F./4 hr | 1,350 | 1,400 | 1,500 |
|---|---|---|---|
| CAT-D Properties: | | | |
| Gasoline, vol. percent | 55.1 | 60.3 | 40.0 |
| Coke, wt. percent | 4.10 | 1.89 | 1.19 |
| Gas, wt. percent | 20.73 | 14.67 | 9.83 |
| Conversion, wt. percent | 71.6 | 67.3 | 45.4 |
| Gas Gravity (Air=1.0) | 1.60 | 1.55 | 1.51 |
| Kaolin Coke Factor | 0.47 | 0.27 | 0.49 |
| Cracking Efficiency | 65.4 | 75.3 | 75.8 |

(b) Another portion of the unreacted pellets was placed in a sealed jar and, without an initial low temperature aging treatment, the jar was maintained at 200° F. for 24 hours. X-ray diffraction patterns of the product showed that synthetic faujasite (6.2° 2θ peak) was the sole zeolite present and that such zeolite was present in substantial amount, indicating that when sodium silicate was used as the source of $Na_2O$ an initial low temperature reaction was not required to produce the desired molecular sieve.

Example IV

This example illustrates the preparation of a high silica content catalyst of excellent thermal and steam stability in accordance with this invention.

The procedure of Example I was repeated with the following reaction mixture:

| | Parts by wt. |
|---|---|
| Satintone #1 | 340 |
| Satintone #2 | 133 |
| ASP 200 | 1160 |
| 16.8% aqueous NaOH solution | 635 |

The reaction mixture was pugged, extruded, oil aged at 100° F. and then crystallized at 200° F. in a sealed jar, as in Example I, producing a mixture of type Y zeolite and kaolinite. A portion of the pellets was dried at 200° F. for three hours. The uncalcined pellets were ion-exchanged with calcium as in Example I and then steamed at 1350° F. with 100 percent steam to adjust the activity. X-ray data indicated that the preparation had a 6.2° 2θ peak height of 58 c./s., indicating that it contained 7 percent crystalline zeolite. The peak at about 31° 2θ indicated that the zeolite was type Y.

A CAT-D test was run on the pellets after 1350° F. steaming. These pellets were then steamed at 1400° F. for four hours with 100 percent steam and another CAT-D test run. The procedure was repeated with steam at 1450° F., 1500° F., 1550° F. and 1600° F. The results are given in Table IV.

TABLE IV
[Stability of experimental catalysts]

| Steam Treatment, °F./4 hr. | Gasoline, vol. percent | Coke, wt. percent | Gas Gravity | Conversion, wt. percent | Kaolin Coke Factor |
|---|---|---|---|---|---|
| 1,350 | 50.9 | 6.87 | 1.55 | 77.1 | 0.60 |
| 1,400 | 53.0 | 6.13 | 1.57 | 77.0 | 0.54 |
| 1,450 | 44.1 | 2.44 | 1.61 | 58.8 | 0.78 |
| 1,500 | 40.1 | 1.63 | 1.50 | 48.2 | 0.59 |
| 1,550 | 40.3 | 1.29 | 1.44 | 46.4 | 0.51 |
| 1,600 | 29.8 | 0.88 | 1.25 | 31.3 | 0.72 |

Data in Table IV show that the preparation was an extremely active cracking catalyst. The 46.4 percent conversion figure for the catalyst after 1550° F. steaming indicates that the catalyst was still very active after such steam treatment.

A sample of the catalyst after the catalytic evaluation at 1550° F. had a 4-ball hardness of 95.8 percent.

Example V

This example illustrates the preparation, also in accordance with this invention, of improved type A molecular sieve adsorbents.

Metakaolin was produced by calcining water-washed Georgia kaolin clay in a muffle furnace at 1300° F. for four hours. The clay was a fine size fraction of clay having at least 92 percent by weight of the particles finer than 2 microns (as determined by the Casagrande method). Eight hundred and fifty grams of the calcined clay was mixed with 170 grams of Edgar Plastic Kaolin clay in a screw-type pug mill. The clays were blended for about 10 minutes and then 752 grams of a 41.9 percent solution of sodium hydroxide in water was added. The mixture was pugged for about 20 minutes. Forty-five milliliters of distilled water was then added to bring the mixture to an extrudable consistency and the charge in the pug mill was pugged for an additional 10 minutes. The mixture was extruded through a die plate under a pressure of 9 to 10 tons into pellets about 1/8-inch diameter.

A portion of the fresh pellets was placed directly in a circulating bath of hydrocarbon oil maintained at 160° F. The pellets were kept in the heated oil for 24 hours. The pellets were placed in a jar and covered with some of the 160° F. hydrocarbon oil. The jar was sealed tightly and placed in an oven maintained at 200° F. The jar was held in the 200° F. oven for 66 hours. From X-ray data it was estimated that the product contained 64 percent crystalline 4A zeolite. Characteristic kaolinite peaks were not present in the X-ray pattern, indicating that the kaolinite structure had been destroyed during the reaction.

One portion of the pellets was activated by heating in air at 200° F. for three hours. Another portion was activated by heating in a muffle furnace at 1050° F. for one-half hour. The activated samples were permitted to cool in sealed jars and then tested for resistance to slaking by immersing the pellets in distilled water at room temperature 75° F. and observing the pellets immediately and after 24 hours. It was found that the pellets treated at 200° F. and 1050° F. were substantially unchanged even after being immersed for 24 hours and substantially no powder appeared in the water, indicating that the activated pellets were water stable and did not break down.

Example VI

Pelleted catalyst composites containing a mixture of a zeolite having substantially the X-ray diffraction pattern of type Y zeolite and calcined kaolin clay were obtained by two procedures.

The first procedure was carried out in accordance with the present invention. 3887 grams of Satintone #1 and 648 grams Satintone #2 were mixed with 4000 ml. of 16 percent sodium hydroxide solution. 9085 grams of a coarse size fraction of high purity raw Georgia kaolin (Min-Chem Special) was added, followed by an additional 850 ml. of the 16 percent caustic solution. The mixture was pugged and extruded. The extrudate was maintained in sealed jars at room temperature of about 75° F. for 24 hours and in a 200° F. oven for 24 hours. The pellets were exchanged with 1.0 N ammonium nitrate solution to a $Na_2O$ content below 0.78 percent (based on the volatile free pellet weight) and then steam stabilized for four hours with 100 percent steam. The product was an active catalyst having a ball mill hardness of 97.7.

In the second procedure, carried out under conditions outside the scope of this invention, type Y zeolite was crystallized, pulverized, pelletized by mixing with water and plastic clay and then steamed. The details of the second procedure are as follows:

666 grams of Satintone #2 was mixed with 600 ml. of a 20 percent (wt./vol.) aqueous solution of sodium hydroxide in a large stainless steel beaker with a propellor-type mixer until the mixture was smooth. Then an additional 1800 ml. of the caustic solution and 1998 grams of Satintone #1 were alternately added over a period of an hour. Mixing was continued for about ¾ hour, at the end of which time the slurry was quite solid as compared with the original mixture. The mixture was aged in a covered container at room temperature (about 70° F.) and then at 200° F. for 70 hours, resulting in the crystallization of sodium zeolite Y. The zeolite sample was washed until the pH of the effluent was less than 12 and then exchanged with a 1.0 N aqueous solution of ammonium chloride in a batch exchange process. The exchange was carried out until the Na+ concentration of the effluent was less than 0.05 percent, as determined by a sodium specific electrode. The product was then washed on a Buchner funnel with distilled water to remove excess chloride ion. The washed ion-exchanged zeolite was air dried, passed through an 8-mesh screen to break up the dried zeolite and then micropulverized with a 0.020" screen. An X-ray analysis of the product indicated that the product contained about 70 percent zeolite and having a $SiO_2/Al_2O_3$ mol ratio of 4.08 to 1.

The analysis of sample was as follows:

| | |
|---|---|
| L.O.I. | 25.88 |
| Percent $Na_2O$ | 2.63 |
| Percent CaO | 0.47 |
| Percent $NH_4$ | 3.80 |

Using a small worm pug mill provided with a water jacket for cooling, 242 grams of the zeolite composition was blended for five minutes with 1170 grams of Edgar Plastic Kaolin clay. Distilled water was slowly added in increments of 25 ml. until a total of 400 ml. was added. The total pugging time was about 45 minutes. Using a piston extruder, 1½ tons of 4" ram, the mixture was extruded into strands about 0.17" diameter. These strands were cut into pellets about 0.17" long. The pellets were placed in a porcelain pan and dried in an oven at 250° F. for 24 hours.

Four-ball catalyst pellet hardness tests were made of each catalyst after catalytic evaluation and the steaming at 1550° F. for four hours. The hardness of the catalyst produced by following the process of the invention was 95.8 percent. The hardness values of the pellets made by the second procedure, outside the scope of this invention, was only 72.2 percent.

*Example VII*

This example illustrates the preparation of a cracking catalyst from a single calcined kaolin clay, sodium hydroxide solution and a coarse size fraction of raw high purity kaolin (Min-Chem Special).

Twelve and one-tenth pounds of Satintone #1 was slowly mixed in a pan with 11.0 pounds of 16.0 percent NaOH solution (weight basis). The mixing was carried out with a glass rod and was continued until the mixture had an apparently uniform consistency. Min-Chem Special was charged to a double-screw pug mill in amount of 20.0 pounds. To the charge in the pug mill, the mixture of calcined kaolin clay and alkali solution was added. One and five-tenths pounds of 16 percent NaOH solution was used to rinse the pan that contained the slurry and, after being used to rinse out the pan, the caustic was added to the pug mill.

The batch was pugged for 10 minutes after the final addition of caustic solution. The temperature of the charge in the pugger was about 90° F. at the end of the pugging. The mixture was extruded under vacuum in a worm-type extruder having 0.17" diameter holes and the extrudate was cut into pellets about 0.25" long as they issued from the extruder. The extrusion was made while the charge in the extruder was under vacuum. The extrudate temperature increased gradually from 100° F. at the beginning of the extrusion to 127° F. after 21 minutes when the extrusion was completed.

The freshly extruded pellets were placed in half gallon glass jars with the pellets substantially filling the jars. The jars were sealed tightly and maintained at room temperature of about 70° F. for 48 hours. The jars with contents were then placed in an oven maintained at 200° F. and held in the oven for a 72 hour period.

Without being washed or dried, 800 to 900 gram batches of the pellets were exchanged at 180° F.±10° F. with 1 N ammonium nitrate solution by continuous percolation of the solution through batches of the pellets in exchange columns for about 48 hours. At the end of the exchanges, the $Na_2O$ content of the effluents were typically less than about 0.05 g./100 ml. (as determined with a pH meter using a sodium-specific electrode). The pH of the effluents was about 7.3.

The exchanged pellets were steam stabilized in a tube furnace at 1563° F. for four hours with 100 percent steam. After the steam treatment, the most significant physical properties of the catalyst were determined and catalytic properties were evaluated by the CAT-D method. The results are reported in Table V.

*Table V.—Properties of experimental catalyst*

| | |
|---|---|
| Vol. percent gasoline | 48.5 |
| Wt. percent coke | 2.3 |
| Wt. percent gas | 13.3 |
| Gas gravity (air=1.0) | 1.36 |
| Wt. percent conversion | 56.2 |
| Kaolin coke factor | 0.55 |
| Ball mill hardness | 96.2 |

We claim:
1. A method for producing a composite base material adapted for use in the preparation of an active contact mass which comprises forming a reaction mixture comprising water, a source of reactive silica, a source of reactive alumina, a water-soluble source of an alkali metal oxide and finely divided hydrated kaolin clay, said water and said sources of silica, alumina and alkali metal oxide being such as to form a slurry in the absence of said hydrated kaolin clay and said hydrated kaolin clay being present in quantity to form coherent particles when present with said other ingredients, said sources of silica, alumina and alkali metal oxide being present in amount such that when said particles are subjected to hydrothermal treatment without dehydration, a crystalline zeolite molecular sieve is formed, forming said mixture into coherent particles, and subjecting said particles to hydrothermal treatment until a synthetic molecular sieve zeolite crystallizes, thereby forming strongly bonded particles comprising a mixture of kaolin clay and crystalline zeolitic molecular sieve.

2. The method of claim 1 wherein said particles comprising kaolin clay and crystallize zeolite are ion-exchanged with nonalkali-metal cations and dehydrated to produce a composite catalyst.

3. The method of claim 1 wherein said source of reactive alumina is a finely divided mineral which contains alumina and said source of reactive silica is a finely divided mineral which contains silica and sodium hydroxide is a source of said alkali metal oxide and is employed in amount such that the sodium hydroxide concentration in said coherent particles is within the range of 10 percent to 35 percent by weight.

4. The method of claim 3 wherein finely divided substantially anhydrous amorphous calcined kaolin clay comprises said source of silica and said source of alumina.

5. The method of claim 4 wherein said calcined kaolin clay includes clay that has been calcined at a temperature and for a time such that the kaolinite exotherm has taken place after dehydration is completed.

6. The method of claim 1 wherein the synthetic crystalline zeolite that crystallizes by hydrothermal treatment of said particles is selected from the group consisting of sodium zeolite X and sodium zeolite Y, and said reaction mixture comprises an aqueous sodium hydroxide solution of 10 percent to 20 percent concentration, 5 to 100 parts by weight of calcined kaolin clay including amorphous particles of kaolin clay that have been calcined under conditions of temperature and time such that the kaolin exotherm has taken place after dehydration is completed, and uncalcined kaolin clay in amount of at least 100 parts by weight and sufficient to form coherent particles with said calcined kaolin clay and sodium hydroxide solution.

7. The method of claim 1 wherein the synthetic crystalline zeolite that crystallizes by hydrothermal treatment of said particles has the X-ray diffraction pattern corresponding substantially to that of sodium zeolite Y, and said reaction mixture comprises: an aqueous sodium hydroxide solution of 10 percent to 20 percent concentration, 1 mol of metakaolin with from 3 to 7 mols of kaolin clay that has been calcined under conditions of temperature and time such that the kaolin exotherm has taken place after dehydration is completed, and uncalcined kaolin clay in amount at least equal to the weight of the metakaolin and said other calcined clay and sufficient to form a plastic mixture.

8. The method of claim 7 wherein said mixture is reacted under hydrothermal conditions at a temperature below 130° F. before being crystallized hydrothermally at a more elevated temperature.

9. The method of claim 1 wherein the synthetic crystalline zeolite that crystallizes by hydrothermal treatment of said particles is selected from the group consisting of sodium zeolite X and sodium zeolite Y, and said reaction mixture comprises metakaolin, sodium silicate solution and uncalcined kaolin clay.

10. The method of claim 1 wherein the synthetic crystalline zeolite that crystallizes by hydrothermal treatment of said particles is sodium zeolite A and said reaction is composed of metakaolin, aqueous sodium hydroxide of 30 percent to 45 percent concentration and uncalcined kaolin clay.

11. In a method for making a composite zeolite-type catalyst, the steps of preparing a mixture comprising: calcined kaolin clay including metakaolin and amorphous dehydrated kaolin clay that has been calcined at a temperature and for a time such that the kaolin exotherm has taken place after dehydration, sodium hydroxide in the form of an aqueous solution, and uncalcined kaolin clay in amount sufficient to preserve the particulate nature of the mixture after the mixture has been shaped into particles, shaping the mixture into particles, and crystallizing said mixture under conditions of pressure and temperature to prevent dehydration, thereby producing particles which, when base exchanged with nonalkali-metal cations and dehydrated, constitute an active cracking catalyst.

12. The method of claim 11 wherein said mixture comprises:
  (1) Substantially completely dehydrated kaolin clay obtained by calcination at temperature below which the kaolin exotherm takes place, 1 mol;
  (2) Substantially completely dehydrated kaolin clay obtained by calcination at temperature above which kaolin exotherm takes place, ½ to 10 mols;
  (3) Fully hydrated uncalcined kaolin clay, at least combined amount of (1) and (2) on a weight basis;
  (4) Sodium hydroxide solution of 10 percent to 30 percent concentration, to supply 0.45 to 1.2 mols $Na_2O$ per mol $Al_2O_3$ in (1) and (2);
and sodium cations in said particles are exchanged with nonalkali-metal ions.

13. A method for making hard and porous catalyst pellets containing synthetic faujasite which comprises forming a uniform mixture of the following materials:
  (1) metakaolin, 1 mol;
  (2) fully hydrated uncalcined kaolin clay, 1 to 30 mols;
  (3) aqueous solution of sodium silicate, to supply 1 mol $Na_2O$ plus 0.05 to 0.80 mols $Na_2O$ per mol (2) and 0.5 to 3.5 mols $SiO_2$;
pelletizing said mixture, heating said pellets at a temperature within the range of about 150° F. to about 200° F. under pressure sufficient to prevent dehydration until synthetic faujasite is formed, exchanging sodium cations in said pellets with nonalkali-metal ions and activating said pellets by calcining them at a temperature and for a time sufficient to dehydrate said hydrated kaolin clay.

14. A method for producing mechanically strong particles composed of a mixture of zeolitic molecular sieve crystals and hydrated kaolin clay crystals which comprises forming particles comprising a mixture of hydrated crystalline kaolin clay, water and sources of alkali metal oxide, silica and alumina, said sources being present in relative proportions to form a crystalline zeolitic molecular sieve when said particles are subjected to hydrothermal treatment without dehydration.
  while said kaolin clay in said particles is still hydrated, heating said particles in the absence of an external aqueous phase under conditions of temperature and pressure sufficient to prevent dehydration until a zeolitic molecular sieve crystallizes, thereby forming particles composed of a mixture of zeolitic molecular sieve crystals and kaolin clay crystals.

15. The method of claim 14 wherein said heating step is carried out by maintaining said particles at a temperature within the range of 70° F. to 130° F. for at least 4 hours and then heating them at a temperature within the range of 150° F. to 200° F. until said zeolite crystallizes.

16. The method of claim 15 in which said particles are immersed in oil when maintained at said temperature within the range of 70° F. to 130° F. and when heated at said temperature within the range of 150° F. to 200° F.

17. A method for making a composite catalyst which comprises: forming a mixture comprising sodium hydroxide solution of 10% to 20% concentration, 1 mol metakaolin, 3 to 7 mols of kaolin clay that has been calcined under conditions of temperature and time such that the kaolin exotherm has taken place after dehydration is completed, uncalcined kaolin in amount at least equal to the weight of the metakaolin and said other calcined kaolin clay and sufficient to form a plastic mixture, the $Na_2O$ oxide in said sodium hydroxide solution being present in amount within the range of 0.50 to 0.75 mols per mol total $Al_2O_3$ in said metakaolin and said other calcined kaolin clay,
  extruding the mixture to form pellets,
  immersing the pellets in oil,
  heating the pellets while they are immersed in the oil under pressure sufficient to prevent dehydration until a zeolite having substantially the X-ray diffraction pattern of sodium zeolite Y crystallizes and crystalline kaolin clay is also still present,
  separating the pellets from the oil,
  ion-exchanging the pellets to exchange sodium ions with nonalkali-metal cations,
  and thermally activating the ion-exchanged pellets.

18. The method of claim 17 wherein said pellets are exchanged with ammonium ion.

References Cited

UNITED STATES PATENTS

| | | | |
|---|---|---|---|
| 2,973,327 | 2/1961 | Mitchell et al. | 252—449 |
| 3,119,659 | 1/1964 | Taggart et al. | 23—112 |
| 3,205,037 | 9/1965 | Maher et al. | 23—112 |
| 3,224,643 | 4/1966 | Schwartz | 252—455 |

DANIEL E. WYMAN, *Primary Examiner.*

C. F. DEES, *Assistant Examiner.*

UNITED STATES PATENT OFFICE
CERTIFICATE OF CORRECTION

Patent No. 3,367,886                        February 6, 1968

Walter L. Haden, Jr., et al.

It is hereby certified that error appears in the above numbered patent requiring correction and that the said Letters Patent should read as corrected below.

Column 9, line 28, for "$Al_2O_3.2SiO)$" read -- $Al_2O_3.2SiO_2)$ --; column 13, line 33, for "coke made of" read -- coke make of --; line 50, for "c./s." " read -- "c./s." --; column 15, line 61, for "calcined kaolines" read -- calcined kaolins --.

Signed and sealed this 22nd day of April 1969.

(SEAL)
Attest:

Edward M. Fletcher, Jr.                             EDWARD J. BRENNER
Attesting Officer                                     Commissioner of Patents